(12) United States Patent
Tanaka et al.

(10) Patent No.: US 8,060,595 B2
(45) Date of Patent: Nov. 15, 2011

(54) MANAGEMENT SYSTEM, MANAGEMENT METHOD AND PROGRAM FOR APPROPRIATELY MANAGING A MANAGED APPARATUS WHILE SECURELY MAINTAINING PRODUCTIVITY OF THE MANAGED APPARATUS

(75) Inventors: Kazuyoshi Tanaka, Hachioji (JP); Yutaka Yasunaga, Hachioji (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 200 days.

(21) Appl. No.: 12/173,980

(22) Filed: Jul. 16, 2008

(65) Prior Publication Data
US 2009/0070449 A1 Mar. 12, 2009

(30) Foreign Application Priority Data
Sep. 11, 2007 (JP) ................................. 2007-235819

(51) Int. Cl.
*G06F 15/173* (2006.01)
(52) U.S. Cl. ....... 709/223; 709/203; 358/1.14; 358/1.15
(58) Field of Classification Search .................. 709/203, 709/223; 358/1.14, 1.15
See application file for complete search history.

(56) References Cited

U.S. PATENT DOCUMENTS

| | | | |
|---|---|---|---|
| 2002/0114004 A1* | 8/2002 | Ferlitsch | 358/1.15 |
| 2004/0114177 A1* | 6/2004 | Matsugi | 358/1.15 |
| 2004/0130744 A1* | 7/2004 | Wu et al. | 358/1.15 |
| 2004/0143651 A1* | 7/2004 | Allen et al. | 709/221 |
| 2005/0237562 A1* | 10/2005 | Seo | 358/1.14 |
| 2006/0170953 A1* | 8/2006 | Okamoto et al. | 358/1.15 |
| 2007/0086054 A1* | 4/2007 | Ikeno | 358/1.16 |
| 2008/0180718 A1* | 7/2008 | Yamashita | 358/1.15 |

FOREIGN PATENT DOCUMENTS

JP 03-064243 A 3/1991

* cited by examiner

*Primary Examiner* — Wing Chan
*Assistant Examiner* — Hitesh Patel
(74) *Attorney, Agent, or Firm* — Holtz, Holtz, Goodman & Chick, PC (57) ABSTRACT

A management system which makes it possible to appropriately manage a managed apparatus, while securely maintaining productivity of the managed apparatus. The system includes a management apparatus, the managed apparatus and an HTTP server. The managed apparatus is provided with a connection controlling section that periodically connects the managed apparatus to the HTTP server at a regular connecting timing, so as to read information sent from and write apparatus information into the HTTP server. The connection controlling section determines whether or not the managed apparatus should actually be connected to the HTTP server at the regular connecting timing, based on a load status or a presence or absence of a current job of the managed apparatus and connects it to the HTTP server asynchronously with the regular connecting timing, when determining that the managed apparatus should not be connected to the HTTP server at the regular connecting timing.

17 Claims, 5 Drawing Sheets

MANAGEMENT SYSTEM, MANAGEMENT METHOD AND PROGRAM FOR APPROPRIATELY MANAGING A MANAGED APPARATUS WHILE SECURELY MAINTAINING PRODUCTIVITY OF THE MANAGED APPARATUS

This application is based on Japanese Patent Application NO. 2007-235819 filed on Sep. 11, 2007, with Japan Patent Office, the entire content of which is hereby incorporated by reference.

BACKGROUND OF THE INVENTION

The present invention relates to a management system that includes a management apparatus and a managed apparatus, a management method and a control program to be employed for the management system, and specifically relates to a management system in which the management apparatus and the managed apparatus are coupled to each other through a server, a management method and a control program to be employed for the management system.

In recent years, there have been increasingly proliferated in the market, a copier, a MFP (Multi Function Peripheral), etc., each of which is provided with a copy function, a facsimile function, a printer function, a scanner function, etc., (hereinafter, referred to as an image forming apparatus as a general term for each of them). Since an operating ratio of such the image forming apparatus is relatively high, and further, it is necessary for the user to periodically apply maintenance and inspection processing to such the image forming apparatus due to a wide variety of consumable parts used for such the image forming apparatus, the image forming apparatus, serving as the managed apparatus, is coupled to the management apparatus through a certain communication network, so that the management apparatus acquires apparatus information indicating statuses of the image forming apparatus concerned, so as to conduct operations for controlling the image forming apparatus, based on the apparatus information acquired from the image forming apparatus concerned.

For instance, with respect to the copy data management system, which is provided with such a terminal device that transmits data representing various kinds of information, such as a number of paper sheets copied by the copier concerned, an operating history of the user, etc., a request for maintenance, etc., to the intensive control apparatus for controlling the concerned copier through a telephone line, JP2876632 (Japanese Patent Publication) sets forth a configuration of the system, which includes: a transmitting section to transmit the abovementioned data to the terminal device; a telephone device; a line connecting section to connect any one of the telephone device and the transmitting section to the telephone line; and a control section to connect the transmitting section to the telephone line so as to transmit the abovementioned data after waiting a predetermined time interval, when the data transmitting condition is established and the telephone device is in a busy status.

In this connection, in order to securely control the image forming apparatus serving as the managed apparatus, it is necessary for the image forming apparatus to periodically transmit its own apparatus information at regular intervals to the management apparatus. However, since the secure maintenance of the productivity is very important for such the production apparatus having a high operating ratio as the image forming apparatus, if a certain job is suspended due to the implementation of operations for communicating with the management apparatus, there arise a problem that the productivity of the image forming apparatus concerned would be deteriorated.

To overcome the abovementioned problem, it may be considered such a method that the operations for communicating with the management apparatus are conducted only during the time when the image forming apparatus enters into the job waiting status. However, since the production apparatus that is continuously operated for 24 hours with the high operating ratio hardly enters into the job waiting status, such the production apparatus as abovementioned could not communicate with the management apparatus indefinitely. Accordingly, there arise another problem that it becomes impossible for the management apparatus to appropriately control the image forming apparatus based on the current apparatus information.

As mentioned in the foregoing, with respect to the communicating operations between the management apparatus and the managed apparatus, it is necessary to take it into account not to deteriorate the productivity of the managed apparatus. However, if excessively great importance is given to the productivity of the managed apparatus, it becomes impossible for the management apparatus to grasp the current statuses of the managed apparatus, as aforementioned. Accordingly, it becomes important to find a compromise between factors derived from productive viewpoints and those derived from controlling viewpoints, so as to appropriately conduct the information communicating operations at an appropriate timing.

SUMMARY OF THE INVENTION

To overcome the abovementioned drawbacks in conventional image forming apparatus, it is one of objects of the present invention to provide a management system, a management method and a program for the same, each of which makes it possible to appropriately manage the managed apparatus, while securely maintaining the productivity of the managed apparatus.

Accordingly, at least one of the objects of the present invention can be attained by the management systems, the management method and the program described as follows.
(1) According to a management system reflecting an aspect of the present invention, the management system, comprises: a management apparatus; a managed apparatus to be managed by the management apparatus; and an HTTP (Hyper-Text Transfer Protocol) server through which the management apparatus and the managed apparatus are coupled to each other; wherein the managed apparatus includes a connection controlling section that performs a first controlling process comprising: periodically connecting the managed apparatus to the HTTP server at a regular connecting timing; and reading information written in advance in the HTTP server by the management apparatus; and writing apparatus information that represents a current state of the managed apparatus into the HTTP server; and a second controlling process comprising: determining whether or not the managed apparatus should be actually coupled to the HTTP server when the regular connecting timing has arrived, based on a loading status of the managed apparatus and/or a presence or absence of a current job being in mid-course of processing; and connecting the managed apparatus to the HTTP server asynchronously with the regular connecting timing according to a rule established in advance, when determining that the managed apparatus should not be coupled to the HTTP server at the regular connecting timing.

(2) According to another aspect of the present invention, in the management system recited in item 1, when determining that the managed apparatus should not be coupled to the HTTP server at the regular connecting timing, the connection controlling section connects the managed apparatus to the HTTP server when the processing of the current job has finished.

(3) According to still another aspect of the present invention, in the management system recited in item 1, when a number of times, the managed apparatus is not coupled to the HTTP server at the regular connecting timing, exceeds a predetermined number, the connection controlling section temporarily suspends the processing of the current job, so as to connect the managed apparatus to the HTTP server.

(4) According to still another aspect of the present invention, in the management system recited in item 1, when the managed apparatus is not coupled to the HTTP server at the regular connecting timing, the connection controlling section writes either the apparatus information acquired at the regular connecting timing when the managed apparatus is not coupled to the HTTP server, or the other apparatus information acquired at a job finalization timing or a job suspension timing, into the HTTP server.

(5) According to still another aspect of the present invention, in the management system recited in item 1, when determining whether or not the managed apparatus should be actually coupled to the HTTP server when the regular connecting timing has arrived, the connection controlling section determines whether or not specific information that affects operations or a reliability of the managed apparatus is included in the apparatus information; and only when determining that the specific information is included in the apparatus information, the connection controlling section connects the managed apparatus to the HTTP server at the regular connecting timing.

(6) According to still another aspect of the present invention, in the management system recited in item 5, when determining that the specific information is included in the apparatus information, the connection controlling section writes only the specific information into the HTTP server.

(7) According to still another aspect of the present invention, in the management system recited in item 5, the managed apparatus is an image forming apparatus, while, the specific information is a warning for a residual amount of consumable materials.

(8) According to a management method reflecting still another aspect of the present invention, the control method to be employed in a management system that includes: a management apparatus; a managed apparatus to be managed by the management apparatus; and an HTTP (Hyper-Text Transfer Protocol) server through which the management apparatus and the managed apparatus are coupled to each other, the control method comprises: periodically connecting the managed apparatus to the HTTP server at a regular connecting timing; and making the managed apparatus read information written in advance in the HTTP server by the management apparatus; and writing apparatus information that represents a current state of the managed apparatus into the HTTP server; wherein the managed apparatus performs the steps of: determining whether or not the managed apparatus should be actually coupled to the HTTP server when the regular connecting timing has arrived, based on a loading status of the managed apparatus and/or a presence or absence of a current job being in mid-course of processing; and connecting the managed apparatus to the HTTP server asynchronously with the regular connecting timing according to a rule established in advance, when determining that the managed apparatus should not be coupled to the HTTP server at the regular connecting timing.

(9) According to a computer readable storage medium reflecting yet another aspect of the present invention, the computer readable storage medium storing a computer executable program for implementing a controlling operation in a management system that includes: a management apparatus; a managed apparatus to be managed by the management apparatus; and an HTTP (Hyper-Text Transfer Protocol) server through which the management apparatus and the managed apparatus are coupled to each other, the program being executable by a computer to cause the computer to perform a process comprises: periodically connecting the managed apparatus to the HTTP server at a regular connecting timing; and making the managed apparatus read information written in advance in the HTTP server by the management apparatus; writing apparatus information that represents a current state of the managed apparatus into the HTTP server; and making the managed apparatus perform the steps of: determining whether or not the managed apparatus should be actually coupled to the HTTP server when the regular connecting timing has arrived, based on a loading status of the managed apparatus and/or a presence or absence of a current job being in mid-course of processing; and connecting the managed apparatus to the HTTP server asynchronously with the regular connecting timing according to a rule established in advance, when determining that the managed apparatus should not be coupled to the HTTP server at the regular connecting timing.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE PREFERRED EMBODIMENT

As described in the "BACKGROUND OF THE INVENTION", in order to securely control the managed apparatus, such as the image forming apparatus or the like, by the management apparatus, it is necessary for the image forming apparatus to periodically transmit the apparatus information that indicates its own statuses to the management apparatus at regular intervals. However, if the job currently performed by the image forming apparatus is suspended every time when transmitting the apparatus information, the productivity of the image forming apparatus concerned tends to be deteriorated as aforementioned. On the other hand, if the apparatus information is transmitted only during the time when no job is performed by the image forming apparatus, it becomes impossible for the management apparatus to control such an image forming apparatus that is continuously operated for 24 hours. As a result, it becomes impossible to speedily cope with running out of consumable materials, such as toner, etc., and there arises a fear that this would greatly obstruct the productive activities to be performed by the image forming apparatus concerned.

In other words, with respect to the managed apparatus having a high operating ratio, such as the image forming apparatus or the like, it is important not only to secure the reasonable productivity, but also to securely control its performances, and accordingly, it becomes necessary to adjust timings of the communications between the management apparatus and the managed apparatus so as to fulfill the demands for both the productivity and the controllability of the managed apparatus.

Further, the management apparatus also notifies the managed apparatus of management information, such as a notification of the maintenance date and time, a software updating operation, etc. In this connection, when the management apparatus and the managed apparatus are coupled to each other through a telephone line, it is applicable that the management apparatus notifies the managed apparatus of the management information as needed. However, when the management apparatus and the managed apparatus are coupled to each other through a mail server or an HTTP (Hyper-Text Transfer Protocol) server, the managed apparatus should be periodically coupled to the mail server or the HTTP server, so as to receive the management information sent from the management apparatus, and accordingly, the abovementioned operations for adjusting the communication timings become further important.

In view of the foregoing, according to the present invention, in order to secure the productivity, when the processing load incurred to the managed apparatus exceeds a predetermined value or a currently processing job exists, the regular connecting operation is skipped (first controlling operation). On the other hand, when the connecting operation is skipped so as to securely conduct the operation for controlling the managed apparatus, the connecting operation is performed at a timing after the currently processing job is finished, asynchronously with the regular timing (second controlling operation). Further, in order to prevent the managed apparatus from occurrence of a serious problem, when a number of times for continuously skipping the connecting operation exceeds a predetermined number of times, the currently processing job is temporarily suspended so as to conduct the connecting operation at a regular timing or another timing being asynchronous with the regular timing (third controlling operation). Still further, in order to suppress the deterioration of the productivity at a minimum level, the second controlling operation or the third controlling operation is conducted only in such a case that the apparatus information includes specific information that affects the operations and reliability of the managed apparatus, while, when the connecting operation is performed asynchronously with the regular timing or when the currently processing job is temporarily suspended to conduct the connecting operation, the managed apparatus is controlled so as to notify the management apparatus of only the specific information abovementioned, as needed (fourth controlling operation). According to the first through fourth controlling operations, it is possible to appropriately control the managed apparatus, specifically, such the managed apparatus that is coupled to the management apparatus through the mail server or the HTTP server, while securely maintaining the productivity of the managed apparatus.

Embodiment

Figure 1:
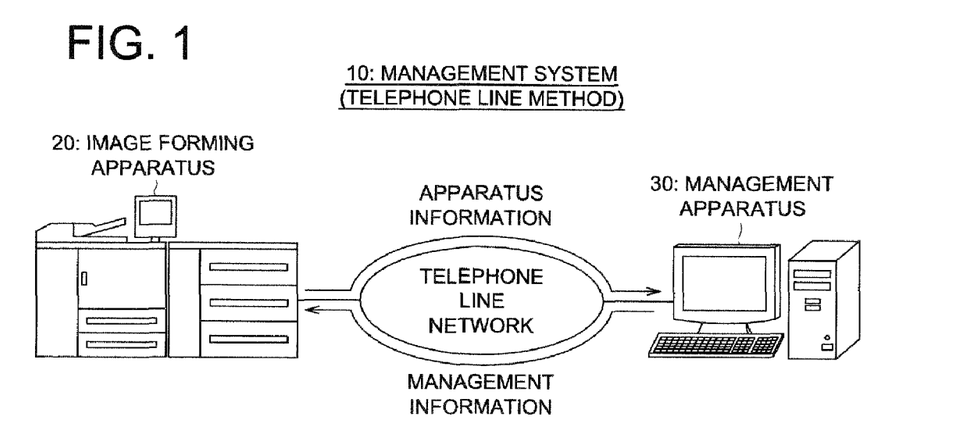
FIG. 1 shows a schematic diagram indicating a configuration of a management system (management data communicating system) embodied in the present invention.
Figure 2:
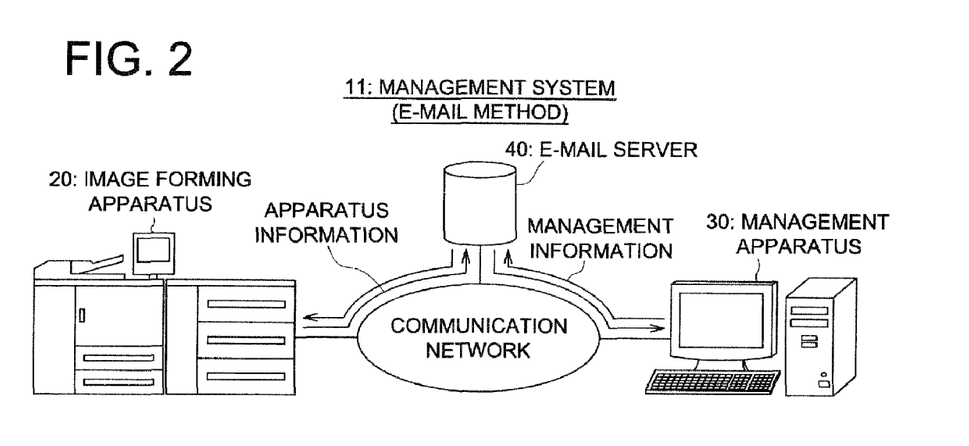
FIG. 2 shows a schematic diagram indicating another configuration of a management system (management data communicating system) embodied in the present invention.
Figure 3:
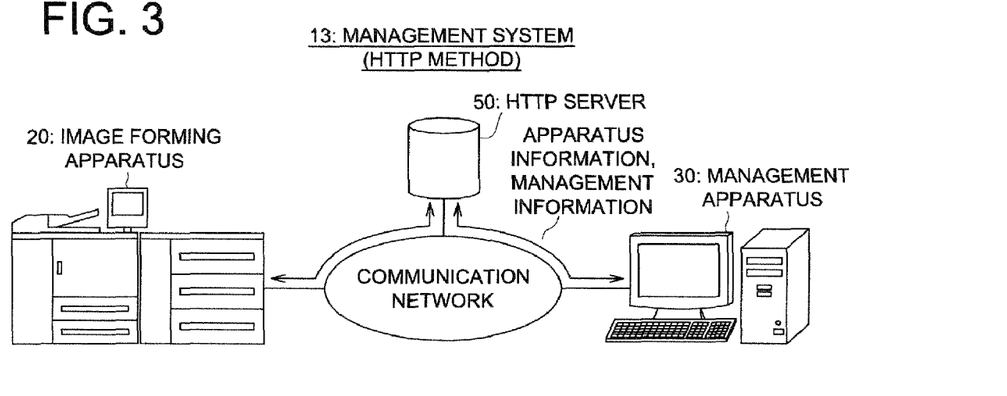
FIG. 3 shows a schematic diagram indicating still another configuration of a management system (management data communicating system) embodied in the present invention.
Figure 4:
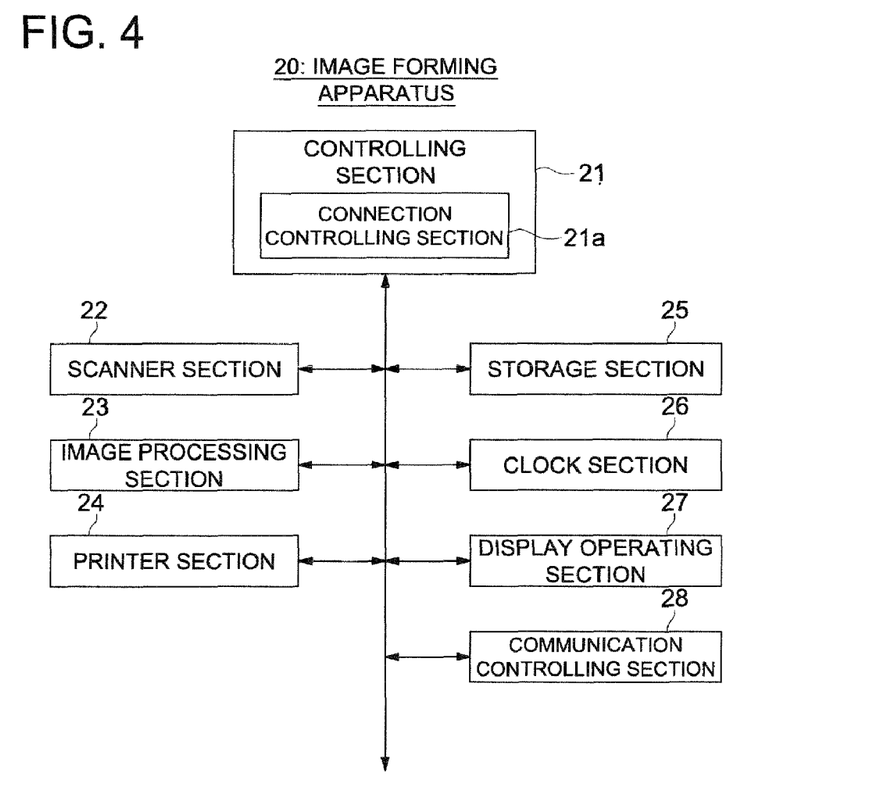
FIG. 4 shows a block diagram indicating a configuration of an image forming apparatus embodied in the present invention.
Figure 5:
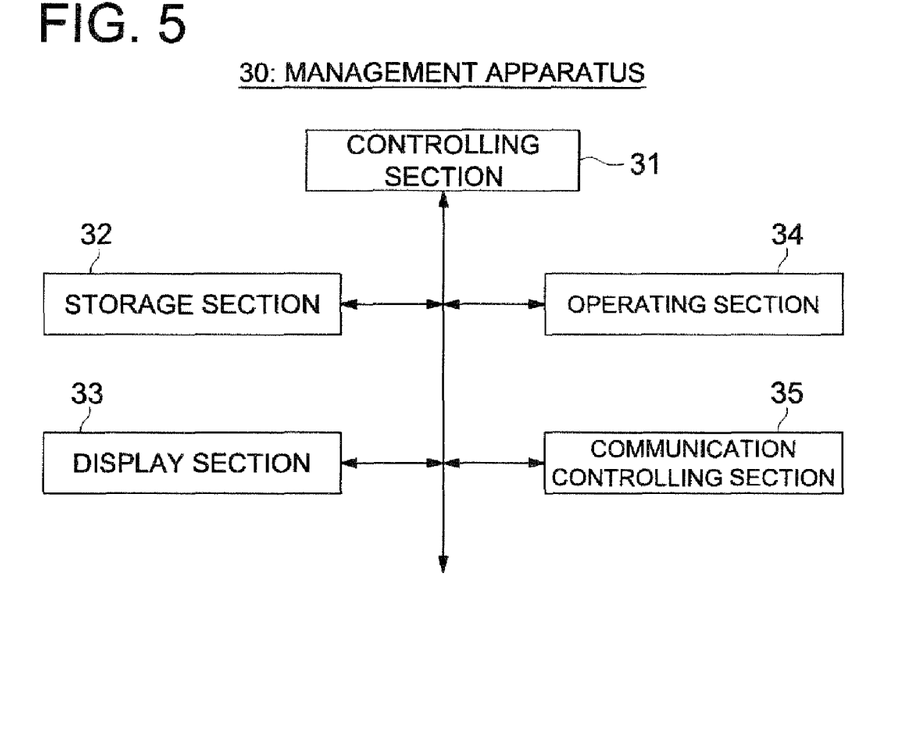
FIG. 5 shows a block diagram indicating a configuration of a management apparatus embodied in the present invention.

In order to describe the preferred embodiment of the present invention in detail, referring to FIG. 1 through FIG. 10, a management system, a management method and a control program, embodied in the present invention, will be detailed in the following. FIG. 1 through FIG. 3 show schematic diagrams indicating various configurations of the management system embodied in the present invention. Further, FIG. 4 shows a block diagram indicating a configuration of the image forming apparatus embodied in the present invention, while FIG. 5 shows a block diagram indicating a configuration of the management apparatus. Still further, FIG. 6 through FIG. 10 show timing charts indicating connection timings between the management apparatus and the image forming apparatus embodied in the present invention.

The management system embodied in the present invention includes a single managed apparatus or a plurality of managed apparatuses, each of which serves as an object to be controlled (hereinafter, an image forming apparatus is exemplified as the managed apparatus), a single management apparatus or a plurality of the management apparatuses, which control the single managed apparatus or the plurality of managed apparatuses, and a communication network through which the image forming apparatus and the management apparatus are coupled to each other. Further, in the abovementioned management system, the managed apparatus notifies the management apparatus of information indicating the current statuses of the managed apparatus (in the case of the image forming apparatus, information indicating a residual amount or a validity term of consumable materials, such as a toner empty indication, etc., or information indicating a using status, such as a value of counter, etc., hereinafter, referred to as apparatus information), while the management apparatus notifies the managed apparatus of information being necessary for controlling the managed apparatus (for instance, information representing a notification of its maintenance date and time, a software updating operation, etc., hereinafter, referred to as management information). According to each of communication methods to be employed for conducting the communication practice between the management apparatus and the managed apparatus, the abovementioned management system is classified into any one of the various categories indicated as follow.

A management system 10 shown in FIG. 1 is configured by employing such a method that couples an image forming apparatus 20 and a management apparatus 30 to each other through an analogue telephone line, a digital telephone line, a facsimile transmission line, etc., (hereinafter, referred to as a telephone line method). In the management system 10, the image forming apparatus 20 telephones the management apparatus 30 at regular intervals so as to transmit the apparatus information from the image forming apparatus 20 to the management apparatus 30 after the connection of the telephone line between them is established. Further, the image forming apparatus 20 also receives the management information sent from the management apparatus 30 at the same time when transmitting the apparatus information or in an asynchronous mode.

Further, a management system 11 shown in FIG. 2 is configured by employing such a method that couples an image forming apparatus 20 and a management apparatus 30 to each other through an E-mail server 40, such as a SMTP (Simple Mail Transfer Protocol) server and a POP (Post Office Protocol) server, an IMAP (Internet Message Access Protocol) server, etc., which are equipped in a TCP/IP (Transmission Control Protocol/Internet Protocol) network, (hereinafter, referred to as an E-mail method) In the management system 11, the image forming apparatus 20 periodically transmits E-mails, in each of which current apparatus information is described, to the E-mail server 40 at regular intervals, so as to store the transmitted E-mails in the E-mail server 40. Then, the management apparatus 30 receives each of the E-mails at a predetermined timing from the E-mail server 40. On the other hand, the management apparatus 30 transmits E-mails, in each of which current management information is described, to the E-mail server 40, so as to store the transmitted E-mails in the E-mail server 40. Then, the image forming apparatus 20 receives each of the E-mails at another predetermined timing from the E-mail server 40. In this connection, it is applicable that the transmitting and the receiving operations of the E-mails are conducted in either a synchronous mode or an asynchronous mode.

Still further, a management system 13 shown in FIG. 3 is configured by employing such a method that couples an image forming apparatus 20 and a management apparatus 30 to each other through an HTTP server 50, such as a Web-DAV (Distributed Authoring and Versioning protocol for the WWW) server, etc., which are equipped in the TCP/IP network, (hereinafter, referred to as an HTTP method). In the management system 13, the image forming apparatus 20 periodically writes current apparatus information into the HTTP server 50 at regular intervals. On the other hand, the management apparatus 30 reads the current apparatus information at a predetermined timing from the HTTP server 50. Further, the management apparatus 30 writes current management information into the HTTP server 50, and the image forming apparatus 20 reads the current management information at another predetermined timing from the HTTP server 50.

Incidentally, in the E-mail method or the HTTP method mentioned in the above, although it is possible for the image forming apparatus 20 to access the E-mail server 40 or the HTTP server 50 so as to check whether or not the management information exists in it, it is impossible for the E-mail server 40 or the HTTP server 50 to directly instruct the image forming apparatus 20. Accordingly, it is necessary for the image forming apparatus 20 to periodically establish a connection with the E-mail server 40 or the HTTP server 50, so as to check whether or not the management information exists in it.

The abovementioned operation is called "polling". Generally speaking, polling is conducted at constant intervals, such as every 30 minutes, etc., established by the image forming apparatus 20 side. Further, although polling is merely an information acquisition practice in conformity with the POP in the E-mail method, it is also possible in the HTTP method to store apparatus information, etc. into the HTTP server 50 at an occasion when the image forming apparatus 20 establishes the connection with the HTTP server 50, without receiving the request from the management apparatus 30. Accordingly, in the normal practice of the HTTP method, the apparatus information to be sent to the HTTP server 50 is written into the HTTP server 50 at the same time when the regular reading operation of the management information is conducted.

As described in the above, although the operation for transmitting the apparatus information can be conducted asynchronously with the operation for receiving the management information in the telephone line method or the E-mail method, since the operation for writing the apparatus information into the HTTP server 50 and the operation for reading the management information are conducted simultaneously in the HTTP method, it is specifically important for the HTTP method to determine how to establish the communication timings.

In this connection, although any one of the communication methods, including the telephone line method, the E-mail method and the HTTP method, is employed for each of the management systems shown in FIG. 1 through FIG. 3, it is also applicable that plural communication methods are employed for conducting the communicating operations between apparatuses included in a single management system.

Next, concrete configurations of the image forming apparatus 20 and the management apparatus 30 that constitutes the management system will be detailed in the following.

<Image Forming Appartus>

As shown in FIG. 4, the image forming apparatus 20 is provided with a controlling section 21, a scanner section 22, an image processing section 23, a printer section 24, a storage section 25, a clock section 26, a display operating section 27, a communication controlling section 28, etc.

The controlling section 21 is constituted by a CPU (Central Processing Unit), a ROM (Read Only Memory), a RAM (Random Access Memory), etc. According to the inputting operations conducted by the user from the display operating section 27, the CPU reads out various kinds of programs stored in the ROM, and develops the read programs on the RAM, so as to control operations to be conducted by the various kinds of sections included in the image forming apparatus 20, and also to control the state of each of the sections, by executing the programs developed on the RAM. Further, the controlling section 21 also serves as a connection controlling section 21a.

The connection controlling section 21a calculates a load of the CPU by using a conventional calculation method at the time when a regular connection time to be notified by the clock section 26 has arrived. When the load of the CPU is equal to or greater than a predetermined value (for instance, the printer section 24, etc., is busy for processing a certain job), the connection controlling section 21a skips the operation for transmitting the apparatus information (in the case of the HTTP method, operation for connecting the image forming apparatus 20 to the HTTP server 50). In this connection, when the operation for transmitting the apparatus information is skipped, the connection controlling section 21a monitors the processing status of the job concerned, and, when recognizing the completion of the job concerned, transmits the apparatus information asynchronously with the regular connection time. Further, if a reserved job, to be successively processed after the currently processed job, exists, the operation for transmitting the apparatus information is conducted at a time being asynchronous with the regular connection time after the currently processing job is finished and before the processing of the reserved job is commenced, so as to commence the processing of the reserved job after the completion of the transmitting operation. Further, when a number of times for continuously skipping the connecting operation exceeds a predetermined number of times, the currently processing job is temporarily suspended, so as to conduct the transmission of the apparatus information at a next regular connection time or at a time being asynchronous with the next regular connection time. Still further, at the time when a power switch of the image forming apparatus 20 turns ON or OFF, the connection controlling section 21a conducts the operation for transmitting the apparatus information asynchronously with the regular connection time. Yet further, only in such the case that the apparatus information includes specific information that affects the operations and the reliability of the image forming apparatus 20 (for instance, a toner empty indication, etc.), the connection controlling section 21a conducts the operation for transmitting the apparatus information asynchronously with the regular connection time, or suspends the processing of the job concerned, and in that case, conducts the operation for transmitting only the specific information as needed.

In this connection, it is applicable that the connection controlling section 21a is configured as hardware, or as a control program to be executed by the computer for causing the computer to perform as the connection controlling section 21a, so as to executes the control program on the controlling section 21.

The scanner section 22 is constituted by a light source to emit a light beam to be scanned on an original document, a CCD (Charge Coupled Device) to convert the light beam reflected from the original document to electric signals, an analogue to digital converter to convert the electric signals to digital image data, so as to read image information recorded on the original document.

The image processing section 23 applies various kinds of image processing operations, such as an expansion or reduction processing, a rotation processing, a frequency conversion processing, a color conversion processing from RGB color image data to YMCK color image data, a gradation conversion processing, etc., to the digital image data read by the scanner section 22 (hereinafter, referred to as scanned image data).

The printer section 24 is provided with: an image forming section to form a toner image to be transferred onto a transfer material; a transferring section to transfer the toner image, formed on the image forming section, onto the transfer material; a fixing section to fix the toner image onto the transfer material; a conveyance section to convey the transfer material; cleaning sections to clean the image forming section, the transferring section and the fixing section; etc., so as to form an image based on inputted image data on the transfer material and to output the transfer material on which the image is formed. In addition, the printer section 24 is further provided with: a monitoring section to monitor a residual amount of toner; and counters, each of which counts a number of printed transfer materials corresponding to each of various sizes of the transfer materials accommodated in the apparatus, so as to transmit the apparatus information, such as the residual amount of toner, values of the counters, etc., to the controlling section 21.

The storage section 25 is constituted by a flash memory, an HDD (Hard Disc Drive), etc., so as to store the apparatus information of each of the sections, the management information of the management apparatus 30, various kinds of data, setting conditions, etc., therein.

The clock section 26 measures a time interval elapsed from the previous connection period, so as to notify the controlling section 21 of an arrival of the next connection time.

The display operating section 27 is configured by mounting a pressure-sensitive operating section, in which transparent electrodes are aligned in a lattice pattern, onto a LCD (Liquid Crystal Display) device or an organic EL (electroluminescence) display device, to detect X-Y coordinate values of a power point, pressed by a finger, a touch pen or the like, as voltage values, so as to output the positional signal, detected as the voltage values, to the controlling section 21 as the operational signals.

The communication controlling section 28 couples the image forming apparatus 20 to the communication network. The function of the communication controlling section 28 varies depending on the communication method to be employed, and accordingly, when the telephone line method is employed, the communication controlling section 28 serves as a modem that modulates the apparatus information and the management information. Further, when the E-mail method is employed, the communication controlling section 28 serves as a mail manager that transmits E-mail to the E-mail server 40 (SMTP server) and also receives E-mail from the E-mail server 40 (POP server), and further, the communication controlling section 28 also conducts various kinds of processing, such as processing for acquiring or creating header information of E-mail, processing for acquiring or creating body information (attached file) of E-mail, encoding and decoding operations in conformity with the MIME (Multipurpose Internet Mail Extension), encrypting or decrypting operations based on the AES (Advanced Encryption Standard), etc. Still further, when the HTTP method is employed, the communication controlling section 28 serves as an HTTP client terminal device that writes the apparatus information into the HTTP server 50 (Web-DAV server) and reads the management information from the HTTP server 50 (Web-DAV server).

<Management Apparatus>

On the other hand, as shown in FIG. 5, the management apparatus 30 is provided with a controlling section 31, a storage section 32, a display section 33, an operating section 34, a communication controlling section 35, etc.

The controlling section 31 is constituted by a CPU, a ROM, a RAM, etc. According to the inputting operations conducted by the user from the operating section 34, the CPU reads out various kinds of programs stored in the ROM, and develops the read programs on the RAM, so as to control operations to be conducted by the various kinds of sections included in the management apparatus 30, and also to control the state of the image forming apparatus 20, by executing the programs developed on the RAM.

The storage section 32 is constituted by a flash memory, an HDD (Hard Disc Drive), etc., so as to store various kinds of data therein. Specifically in the present embodiment, the apparatus information acquired from each of the image forming apparatuses 20, the management information to be transmitted to the image forming apparatus 20, etc. are stored in the storage section 32.

The display section 33 is constituted by a LCD (Liquid Crystal Display) device or an organic EL (electroluminescence) display device, so as to display various kinds of controlling screens on the display screen, according to the display signals sent from the controlling section 31. Further, the operating section 34 is constituted by a keyboard, a mouse, etc.

The communication controlling section 35 couples the management apparatus 30 to the communication network. As well as aforementioned, the function of the communication controlling section 35 varies depending on the communication method to be employed, and accordingly, when the telephone line method is employed, the communication controlling section 35 serves as a modem that modulates the apparatus information and the management information. Further, when the E-mail method is employed, the communication controlling section 35 serves as a mail manager that receives E-mail from the E-mail server 40 (POP server) and also transmits E-mail to the E-mail server 40 (SMTP server). Still further, when the HTTP method is employed, the communication controlling section 35 serves as an HTTP client terminal device that reads the apparatus information from the HTTP server 50 (Web-DAV server) and writes the management information into the HTTP server 50 (Web-DAV server).

In this connection, each configuration of the image forming apparatus 20 and the management apparatus 30 is merely one of various examples, and can be varied by a skilled person without departing from the spirit and scope of the invention. For instance, although the image forming apparatus 20 is assumed as a multi-functional peripheral that is provided with the scanner section 22, the image processing section 23 and the printer section 24 in the configuration shown in FIG. 4, it is also applicable that the multi-functional peripheral is further provided with a post processing apparatus that conducts various kinds of post processing, such as a punching operation, a stapling operation, a bind-stopping operation, etc., etc.

Next, referring to FIG. 6 through FIG. 10, various kinds of communication timings in the management system will be detailed in the following. In this connection, the HTTP method shown in FIG. 3 will be exemplified in the following description.

As aforementioned, specifically when the image forming apparatus serving as the managed apparatus is a mass-production apparatus, such the apparatus tends to enter a busy status for a long time, and accordingly, sometimes, still conducts the printing operation, the scanning operation, etc. at the regular connecting period. At that time, since the operations for communicating the apparatus information and the management information also requires usage of the CPU resources, if the communicating operations are implemented as it is, various inconveniences, for instance, an error occurrence in the printing operation, a dropdown of a number of printed sheets, etc., would possibly occur. Such the inconveniences would be allowed in the normal copier equipped in the office, but should not be allowed in the mass-production apparatus for which the productivity is regarded as an important factor.

Accordingly, at the time when the regular connecting time has arrived, the connection controlling section 21a conducts the controlling operations for skipping the regular communication, when determining that the communicating operations would possibly affects the productivity of the concerned apparatus, based on the current state of the image forming apparatus 20. In this connection, it is applicable that the current state of the image forming apparatus 20 is determined by actually calculating the load of the CPU or based on the fact that a specific function (for instance, a printing function) is currently conducting the job processing.

However, since it is impossible forever to implement the operation for transmitting the apparatus information or acquiring the management information only by simply skipping the communication, the connection controlling section 21a implements the communicating operation at a specific timing determined in advance, according to a predetermined rule.

The first specific timing abovementioned is determined as such an occasion that the power switch of the image forming apparatus 20 is turned ON, namely, since no job is in mid-course of processing at the time when the power source is turned ON, no problem arises even if the communicating operation is implemented immediately after the power source is turned ON. Accordingly, detecting the fact that the power source has been turned ON, the connection controlling section 21a acquires the current apparatus information, such as the residual amounts of consumable materials, the values of various counters, etc., from each of the sections (for instance, the printer section 24); and successively, controls the communication controlling section 28 to couple the image forming apparatus 20 to the HTTP server 50; and still successively, confirms the directory created in advance in the HTTP server 50 and corresponding to the image forming apparatus 20 concerned; and yet successively, if the management information is written in the directory concerned, reads out the management information concerned, and at the same time, writes the apparatus information into the directory concerned. Referring to the drawings, the abovementioned state transition will be detailed in the following. Each of FIG. 6 through FIG. 10 shows a relationship between the statuses of the image forming apparatus 20 (machine status), the regular connecting timings and the actual connecting timings. Specifically, timing (1) shown in FIG. 6 indicates the actual communication at the time when the power source has been turned ON.

The second specific timing abovementioned is determined as such an occasion that a current job is completed. This is because, no problem arises even if the communicating operation is implemented during a state of waiting a next job (in other words, an idling status) after the current job is completed. Accordingly, detecting the fact that the current job has been completed, the connection controlling section 21a acquires the current apparatus information from each of the sections, asynchronously with the regular connecting timing; and successively, controls the communication controlling section 28 to couple the image forming apparatus 20 to the HTTP server 50; and still successively, confirms the predetermined directory created in advance in the HTTP server 50; and yet successively, if the management information is written in the directory concerned, reads out the management information concerned, and at the same time, writes the apparatus information into the directory concerned. In this connection, timing (c) shown in FIG. 6 indicates the regular connecting timing skipped by the connection controlling section 21a, while timing (4) shown in FIG. 6 indicates the actual communication at the time when the current job has been completed.

Figure 6:
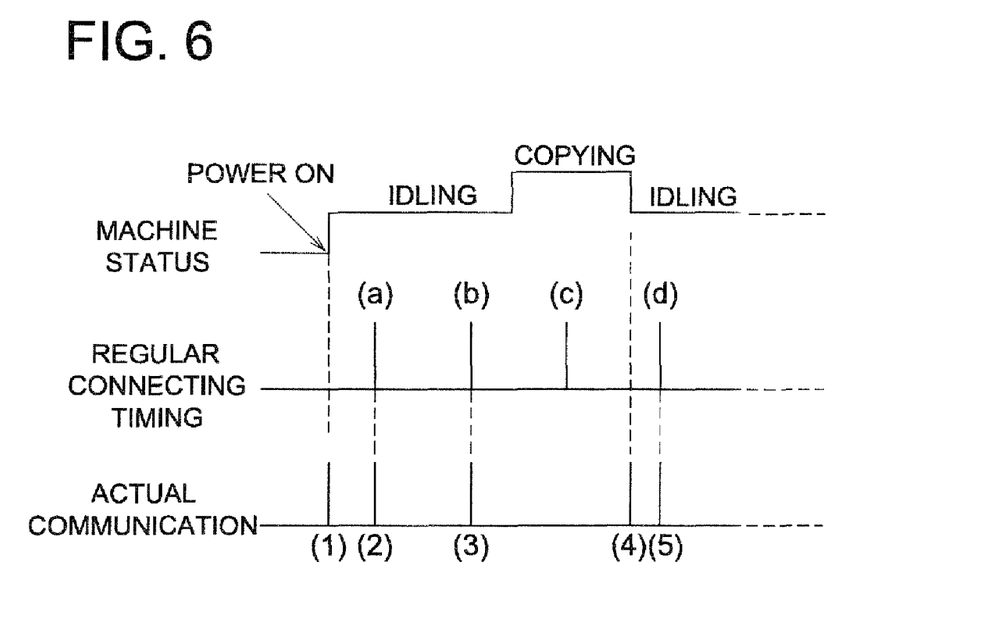
FIG. 6 shows a timing chart indicating connecting timings of an image forming apparatus embodied in the present invention, (when a power source of the image forming apparatus is turned ON, and a regular connecting timing is skipped once)
Figure 7:
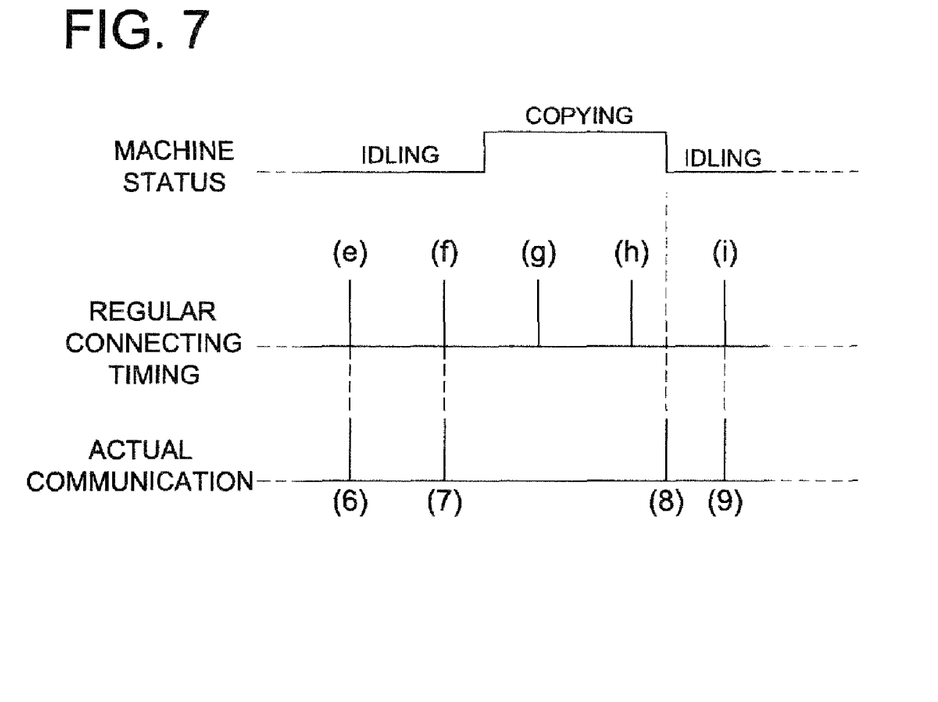
FIG. 7 shows a timing chart indicating connecting timings of an image forming apparatus embodied in the present invention, (when a regular connecting timing is skipped twice)
Figure 8:
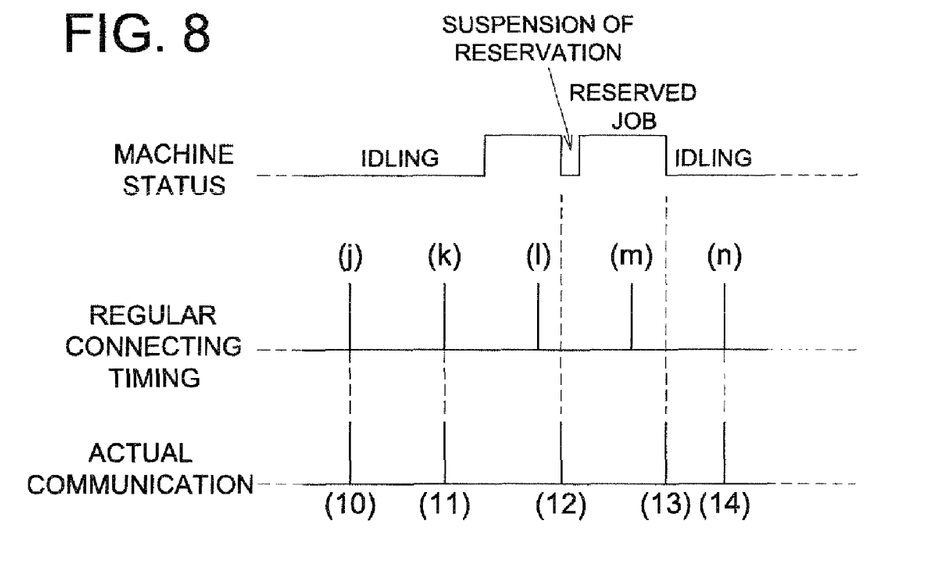
FIG. 8 shows a timing chart indicating connecting timings of an image forming apparatus embodied in the present invention, (when a regular connecting timing is skipped twice)
Figure 9:
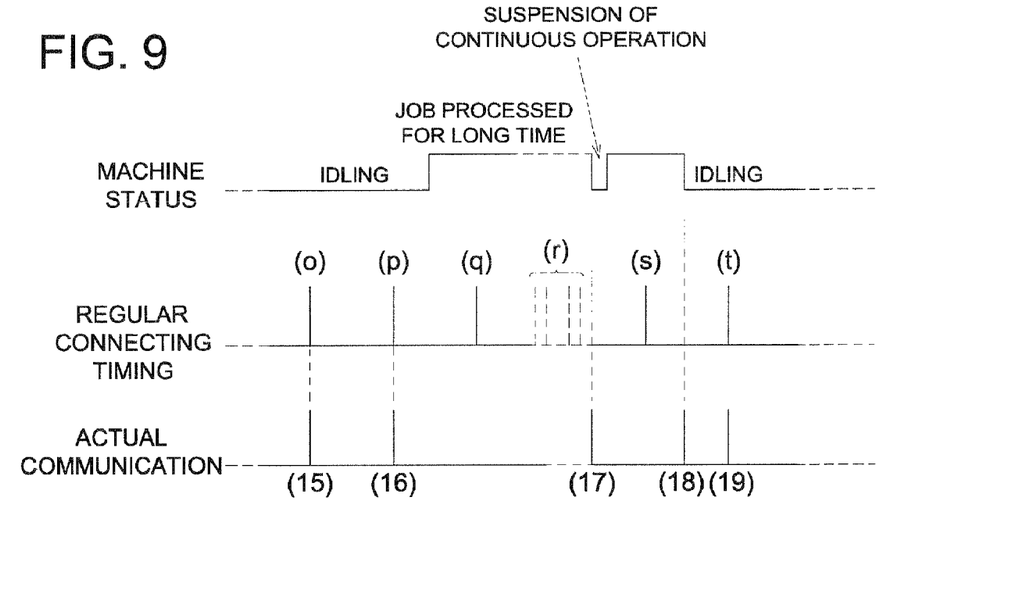
FIG. 9 shows a timing chart indicating connecting timings of an image forming apparatus embodied in the present invention, (when a regular connecting timing is skipped a predetermined number of times)

In this connection, it is applicable that the apparatus information, to be written into the HTTP server 50 during the communicating operations after the current job has been completed, represents either apparatus statuses just after the current job is finished or those at the regular connecting timing skipped (timing (c) shown in FIG. 6). Further, it is applicable that the abovementioned communication controlling practice is always conducted every time when the current job is finished. However, if the operations for communicating with the HTTP server 50 are forcibly implemented even when the current statuses of the image forming apparatus 20 do not affect its operations and reliability, there is a fear that the commencement of the next job would be inevitably delayed by the time interval for implementing the communicating operations concerned, resulting in a deterioration of the apparatus productivity. Accordingly, to overcome such the drawback, the image forming apparatus 20 can be so constituted that the connection controlling section 21a determines whether or not the acquired apparatus information includes specific information, which possibly affects the operations and the reliability of the image forming apparatus 20 (for instance, a toner empty indication), so as to conduct the operations for communicating with the HTTP server 50 only when determining that the acquired apparatus information includes the specific information abovementioned. Still further, it is applicable that all of the acquired apparatus information is written into the HTTP server 50 at the time of writing the apparatus information into the HTTP server 50. However, in order to reduce the time consumption required for communicating with the HTTP server 50, the system can be so constituted that only the specific information abovementioned is written into the HTTP server 50.

Further, in the case that the second specific timing is employed, sometimes, the regular connecting timing has been skipped at plural times, depending on the kind of job. In the above case, irrespective of the number of times for skipping the regular connecting timing, the connection controlling section 21a may couple the image forming apparatus 20 to the HTTP server 50 once after the processing of the job is finished. The timings (g) and (h) shown in FIG. 7 indicate the regular connecting timings skipped by the connection controlling section 21a, while, the timing (8) represents the communicating operation actually conducted at the time of job completion (herein, a copy operation). In this connection, it is applicable that the apparatus information in the abovementioned case represents either apparatus statuses acquired at the time when any one of the regular connecting timings is skipped (preferably, such the apparatus information that has a notification priority higher than others) or those acquired at the time when the job is completed.

Still further in the case that the second specific timing is employed, sometimes, a next job (reserved job), to be successively processed after the current job has been completed, would be reserved. In the above case, there arises a fear that the reserved job is implemented immediately after the current job is finished, and therefore, highly loaded state of the image forming apparatus 20 is still maintained, resulting in re-skipping of the regular connecting operation. On the other hand, since it takes only several seconds to complete the operation for communicating with the HTTP server 50, no problem arises even if the reserved job is made to wait for such a short time interval. Accordingly, detecting the completion of the processing for the current job, the connection controlling section 21a immediately couples the image forming apparatus 20 to the HTTP server 50 preceding to the commencement of processing the reserved job, so as to write the apparatus information into the predetermined directory. The timing (1) shown in FIG. 8 indicate the regular connecting timing skipped by the connection controlling section 21a, while, the timing (12) represents the communicating operation actually conducted at the time of job completion. In this connection, it is applicable that the apparatus information in the abovementioned case represents either apparatus statuses acquired at the time when the regular connecting timing is skipped or those acquired at the time when the job is completed. Further, the system can be so constituted that the operations for communicating with the HTTP server 50 are conducted only when the acquired apparatus information includes the specific information or only the specific information is written into the HTTP server 50, as well as aforementioned.

Still further in the case that the second specific timing is employed, if the image forming apparatus 20 has been continuously operated for a long time, all of the regular connecting operations are skipped, and accordingly, the image forming apparatus 20 would fall into a state that no communicating operation can be conducted. In such the event, the connection controlling section 21a counts the number of times the regular connecting operation is skipped. When detecting that the counted number of times exceeds a predetermined number of times (for instance, ten times), the connection controlling section 21a temporarily suspends the processing of the current job so as to write the apparatus information into the predetermined directory, by giving a higher priority to the controlling aspect rather than the productivity so that no incident affecting the operations and the reliability of the image forming apparatus 20 occurs. The timings (q) and (r) shown in FIG. 9 indicate the regular connecting timings skipped by the connection controlling section 21a, while, the timing (17) represents the communicating operation actually conducted during the time when the current job is suspended. In this connection, it is applicable that the apparatus information in the abovementioned case represents either apparatus statuses acquired at the time when the regular connecting timing is skipped or those acquired at the time when the job is completed. Further, the system can be so constituted that the operations for communicating with the HTTP server 50 are conducted only when the acquired apparatus information includes the specific information or only the specific information is written into the HTTP server 50, as well as aforementioned.

Figure 10:
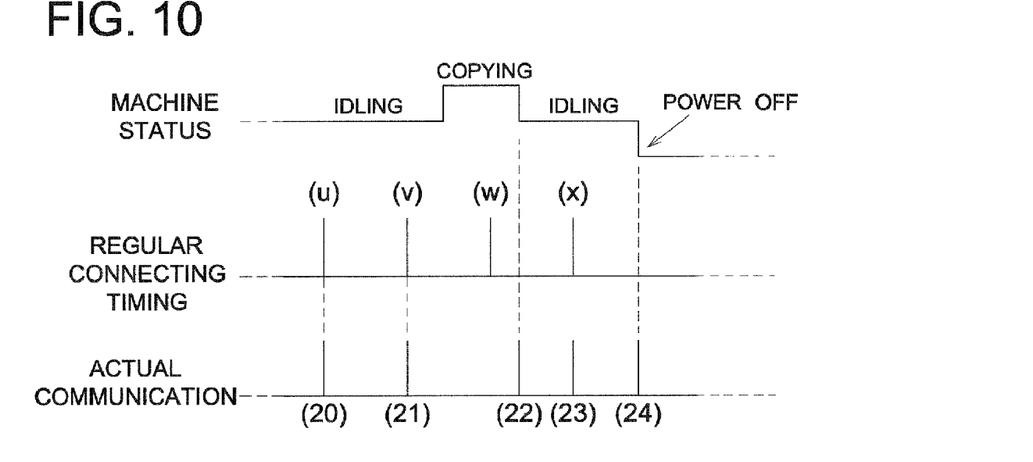
FIG. 10 shows a timing chart indicating connecting timings of an image forming apparatus embodied in the present invention, (when a power source of the image forming apparatus is turned OFF).

Yet further, the third specific timing to be employed is such timing when the power source of the image forming apparatus 20 is turned OFF. Since no job that is in mid-course of processing exists when the power source is shut down, no problem would occur even if the timing of the power shutdown somewhat delayed. Accordingly, detecting a command signal for instructing the power shutdown, the connection controlling section 21a acquires the current apparatus information from each of the sections, asynchronously with the regular connecting timing; and successively, controls the communication controlling section 28 to couple the image forming apparatus 20 to the HTTP server 50; and still successively, reads out the management information from the predetermined directory of the HTTP server 50, and at the same time, writes the acquired apparatus information into the directory concerned. The timing (24) shown in FIG. 10 represents the communicating operation actually conducted at the time when the power source of the image forming apparatus 20 is turned OFF. In this connection, when the image forming apparatus 20 is so constituted that its own power source should be turned OFF by inevitably confirming the completion of the transmitting operation after the transmission handshake is established, it becomes impossible to shut down the power source of the image forming apparatus 20 if the communication currently established cannot be cut off due to an unexpected accident. Accordingly, to cope with such the case, it is possible to employ, for instance, a timer, so as to forcibly shut down the power source of the image forming apparatus 20.

As described in the foregoing, the controlling section 21 of the image forming apparatus 20 is provided with the connection controlling section 21a configured as either hardware or software, so that the connection controlling section 21a determines whether or not the regular connecting operation should be implemented, based on a loading status of the image forming apparatus 20 and/or presence or absence of a currently processed job, while, when skipping the regular connecting operation, the connection controlling section 21*a* conducts the connecting operation asynchronously with the regular connecting operation, according to a rule established in advance. Therefore, according to the above, it becomes possible to appropriately control the image forming apparatus 20, while securely maintaining the productivity of the image forming apparatus 20.

Incidentally, although such the case that the image forming apparatus 20, serving as a managed apparatus, is controlled by the management apparatus has been exemplified as the preferred embodiment of the present invention in the foregoing, the scope of the present invention is not limited to the embodiment mentioned in the above. The present invention can be also applied to an arbitral kind of managed apparatus to be controlled by the management apparatus 30, as well.

The present invention is available for an arbitral kind of management system that comprises a management apparatus and a managed apparatus to be controlled by the management apparatus, a management method to be employed in the management system, and a controlling program to be executed in the management system.

According to a management system, a management method, and a controlling program, embodied in the present invention, it becomes possible to appropriately control the image forming apparatus 20, while securely maintaining the productivity of the image forming apparatus 20.

This is because, in the management system in which the management apparatus and the managed apparatus are coupled to each other through the HTTP server, and the managed apparatus is periodically coupled to the HTTP server at a regular connecting timing so as to read the management information sent from the management apparatus and at the same time to write its own apparatus information into the HTTP server, the managed apparatus is provided with the connection controlling section to determine whether or not the managed apparatus should be actually coupled to the HTTP server when the regular connecting timing has arrived, based on the loading status of the managed apparatus and/or the presence or absence of the current job being in mid-course of processing. Further, the connection controlling section conducts the various controlling operations, such as skipping the regular connecting operation when determining that the load incurred to the managed apparatus exceeds the predetermined value, connecting the managed apparatus itself to the HTTP server asynchronously with the regular connecting timing when the processing of the currently job has finished, temporarily suspending the processing of the current job so as to connect the managed apparatus to the HTTP server when the number of times the managed apparatus is not coupled to the HTTP server at the regular connecting timing exceeds the predetermined number, connecting the managed apparatus itself to the HTTP server asynchronously with the regular connecting timing when the power source of the managed apparatus is turned ON or OFF, etc. Still further, when the specific information that possibly affects the operations and the reliability of the managed apparatus is included in the apparatus information, the connection controlling section conducts such the operations as connecting the managed apparatus itself to the HTTP server asynchronously with the regular connecting timing, writing only the specific information into the HTTP server, etc.

While the preferred embodiments of the present invention have been described using specific term, such description is for illustrative purpose only, and it is to be understood that changes and variations may be made without departing from the spirit and scope of the appended claims.

What is claimed is:

1. A management system, comprising:
a management apparatus;
a managed apparatus to be managed by the management apparatus; and
an HTTP (Hyper-Text Transfer Protocol) server through which the management apparatus and the managed apparatus are coupled to each other;
wherein the managed apparatus includes a connection controlling section which performs a first controlling process and a second controlling process, wherein the first controlling process performed by the connection controlling section comprises:
 periodically controlling to connect the managed apparatus to the HTTP server every time when a regular connecting timing arrives;
 reading information written in advance in the HTTP server by the management apparatus; and
 writing apparatus information that represents a current state of the managed apparatus into the HTTP server;
wherein the second controlling process performed by the connection controlling section comprises:
 determining whether or not the managed apparatus should actually be connected to the HTTP server when the regular connecting timing has arrived, based on a load status of the managed apparatus, or a presence or absence of a job currently being processed by the managed apparatus; and
 connecting the managed apparatus to the HTTP server at a specific timing, other than the regular connecting timing, according to a rule established in advance, when the connection controlling section determines that the managed apparatus should not be connected to the HTTP server at the regular connecting timing; and
wherein, when a number of times the managed apparatus is not connected to the HTTP server at the regular connecting timing exceeds a predetermined number, the connection controlling section temporarily suspends the processing of the current job so as to connect the managed apparatus to the HTTP server.

2. The management system of claim 1, wherein, when the connection controlling section determines that the managed apparatus should not be connected to the HTTP server at the regular connecting timing, the connection controlling section connects the managed apparatus to the HTTP server when the processing of the current job has finished.

3. The management system of claim 1, wherein, when the managed apparatus is not connected to the HTTP server at the regular connecting timing, the connection controlling section is configured to write one of apparatus information acquired at the regular connecting timing when the managed apparatus was not connected to the HTTP server, and other apparatus information acquired at a job finalization timing or a job suspension timing, into the HTTP server.

4. The management system of claim 1, wherein, when determining whether or not the managed apparatus should actually be connected to the HTTP server when the regular connecting timing has arrived, the connection controlling section determines whether or not specific information that affects operation or reliability of the managed apparatus is included in the apparatus information; and
 wherein, when the connection controlling section determines that the specific information is included in the apparatus information, the connection controlling section connects the managed apparatus to the HTTP server at the regular connecting timing.

5. The management system of claim 4, wherein, when the connection controlling section determines that the specific information is included in the apparatus information, the connection controlling section writes only the specific information among the apparatus information into the HTTP server.

6. The management system of claim 4, wherein the managed apparatus is an image forming apparatus, and the specific information is a warning for a residual amount of consumable materials.

7. A management method to be employed in a management system that includes: a management apparatus; a managed apparatus to be managed by the management apparatus; and an HTTP (Hyper-Text Transfer Protocol) server through which the management apparatus and the managed apparatus are coupled to each other, the method comprising:
   periodically controlling to connect the managed apparatus to the HTTP server every time when a regular connecting timing arrives, wherein whether or not the managed apparatus should actually be connected to the HTTP server when the regular connecting timing has arrived is determined based on a load status of the managed apparatus, or a presence or absence of a job currently being processed by the managed apparatus;
   making the managed apparatus read information written in advance in the HTTP server by the management apparatus; and
   writing apparatus information that represents a current state of the managed apparatus into the HTTP server;
   wherein when it is determined that the managed apparatus should not be connected to the HTTP server at the regular connecting timing, the managed apparatus is connected to the HTTP server at a specific timing, other than the regular connecting timing, according to a rule established in advance; and
   wherein, when a number of times the managed apparatus is not connected to the HTTP server at the regular connecting timing exceeds a predetermined number, temporarily suspending the processing of the current job so as to connect the managed apparatus to the HTTP server.

8. The management method of claim 7, wherein, when it is determined that the managed apparatus should not be connected to the HTTP server at the regular connecting timing, the managed apparatus is connected to the HTTP server when the processing of the current job has finished.

9. The management method of claim 7, wherein, when the managed apparatus is not connected to the HTTP server at the regular connecting timing, the managed apparatus is configured to write one of apparatus information acquired at the regular connecting timing when the managed apparatus was not connected to the HTTP server, and other apparatus information acquired at a job finalization timing or a job suspension timing, into the HTTP server.

10. The management method of claim 7, further comprising:
    determining whether or not specific information that affects operation or reliability of the managed apparatus is included in the apparatus information;
    wherein, when it is determined that the specific information is included in the apparatus information, the managed apparatus is connected to the server at the regular connecting timing.

11. The management method of claim 10, wherein, when it is determined that the specific information is included in the apparatus information, only the specific information among the apparatus information is written into the HTTP server.

12. The management method of claim 10, wherein the managed apparatus is an image forming apparatus, and the specific information is a warning for a residual amount of consumable materials.

13. A non-transitory computer readable recording medium having a computer readable program stored thereon for implementing a controlling operation in a management system that includes: a management apparatus; a managed apparatus to be managed by the management apparatus; and an HTTP (Hyper-Text Transfer Protocol) server through which the management apparatus and the managed apparatus are coupled to each other, the program being executable by a computer to cause the computer to perform functions comprising:
    periodically controlling to connect the managed apparatus to the HTTP server every time when a regular connecting timing arrives, wherein whether or not the managed apparatus should actually be connected to the HTTP server when the regular connecting timing has arrived is determined based on a load status of the managed apparatus, or a presence or absence of a job currently being processed by the managed apparatus;
    making the managed apparatus read information written in advance in the HTTP server by the management apparatus; and
    writing apparatus information that represents a current state of the managed apparatus into the HTTP server;
    wherein when it is determined that the managed apparatus should not be connected to the HTTP server at the regular connecting timing, the managed apparatus is connected to the HTTP server at a specific timing, other than the regular connecting timing, according to a rule established in advance; and
    wherein, when a number of times the managed apparatus is not connected to the HTTP server at the regular connecting timing exceeds a predetermined number, temporarily suspending the processing of the current job so as to connect the managed apparatus to the HTTP server.

14. The non-transitory computer readable recording medium of claim 13, wherein, when it is determined that the managed apparatus should not be connected to the HTTP server at the regular connecting timing, the managed apparatus is connected to the HTTP server when the processing of the current job has finished.

15. The non-transitory computer readable recording medium of claim 13, wherein, when the managed apparatus is not connected to the HTTP server at the regular connecting timing, the managed apparatus is configured to write one of apparatus information acquired at the regular connecting timing when the managed apparatus was not connected to the HTTP server, and other apparatus information acquired at a job finalization timing or a job suspension timing, into the HTTP server.

16. The non-transitory computer readable recording medium of claim 13, further performing a function comprising:
    determining whether or not specific information that affects operation or reliability of the managed apparatus is included in the apparatus information;
    wherein, when it is determined that the specific information is included in the apparatus information, the managed apparatus is connected to the HTTP server at the regular connecting timing.

17. The non-transitory computer readable recording medium of claim 16, wherein, when it is determined that the specific information is included in the apparatus information, only the specific information among the apparatus information is written into the HTTP server.

* * * * *